W. FINLEY.
MEAT CHOPPER ATTACHMENT.
APPLICATION FILED MAY 16, 1913.
1,158,472.
Patented Nov. 2, 1915.
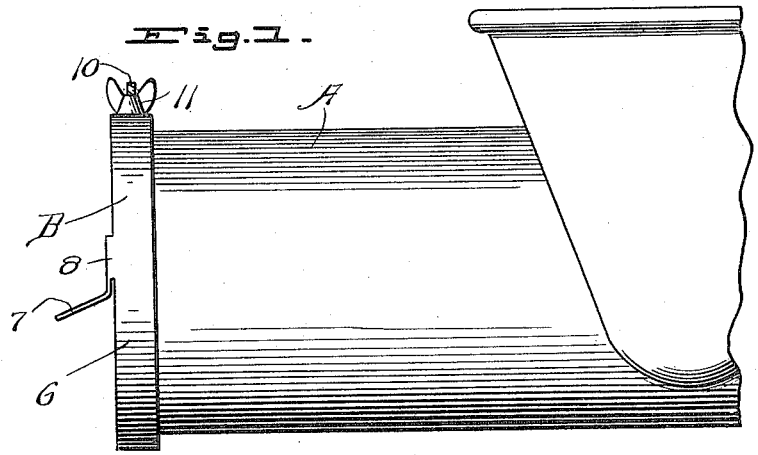
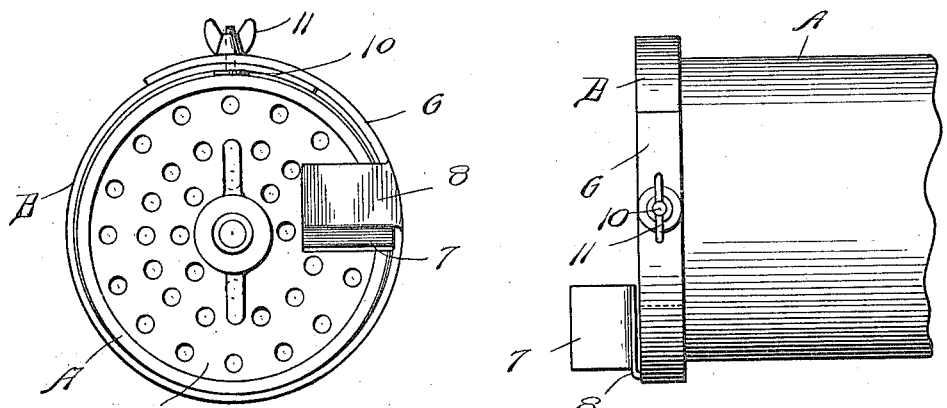
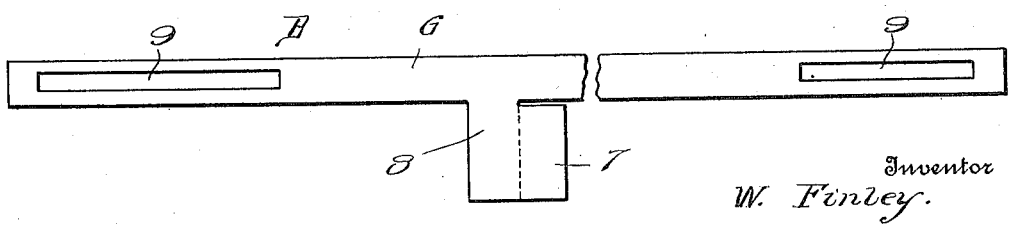
Witnesses
Inventor
W. Finley.
Attorneys

UNITED STATES PATENT OFFICE.

WILLELLA FINLEY, OF GREENLEAF, KANSAS.

MEAT-CHOPPER ATTACHMENT.

1,158,472.  Specification of Letters Patent.  Patented Nov. 2, 1915.

Application filed May 16, 1913. Serial No. 768,181.

*To all whom it may concern:*

Be it known that I, WILLELLA FINLEY, a citizen of the United States, residing at Greenleaf, in the county of Washington, State of Kansas, have invented certain new and useful Improvements in Meat-Chopper Attachments; and I do hereby declare the following to be a full, clear, and exact description of the invention, such as will enable others skilled in the art to which it appertains to make and use the same.

This invention relates to certain novel and useful improvements in a device adapted to be attached to ordinary meat choppers for the purpose of guiding chopped meat into a dish or other receptacle placed adjacent the discharge end of the chopper.

In carrying out my invention it is my purpose to provide an attachment of this character embodying a clamping section which is adapted to be attached to the chopper and a baffle or deflecting member carried by the clamping section.

With the above recited objects and others of a similar nature in view, my invention consists in the construction, combination and arrangement of parts set forth in and falling within the scope of the appended claims.

In the accompanying drawings: Figure 1 is a view in side elevation of a portion of a conventional form of chopper showing my invention applied thereto. Fig. 2 is a front view thereof. Fig. 3 is a top plan view of a portion of the chopper and my invention applied thereto. Fig. 4 is a plan view of the blank from which my attachment is formed.

Referring now to the accompanying drawings in detail, the letter A indicates a conventional form of chopper with the front plate thereof shown at 5.

The letter B designates my attachment as an entirety, this attachment being formed from a single length of metal and includes the attaching band 6 and the deflecting plate 7 which is connected to the band by the portion 8. The band 6 forms the attaching or clamping section of my device, and in order to fasten it to the chopper, this band is provided with the longitudinal slots 9 located adjacent the ends of the band. A headed bolt 10 is provided for fastening the ends of the band together, this bolt being provided with the thumb nut 11.

In use, the band or clamping section 6 of the attachment is placed around the end of the chopper, and the thumb nut is rotated so as to clamp the ends of the band together and hold them on the end of the chopper. The portion 8 is disposed over the discharge end of the chopper while the deflecting plate 7 is positioned at an acute angle to the discharge end 5 of the chopper.

As the meat is ground, the chopped meat discharged will be deflected downwardly by the plate 7 into the proper receptacle, as will be readily understood.

What I claim is:

1. An article of the class described comprising a clamping band, and a deflecting plate arranged at an angle to the band.

2. An article of the class described comprising a clamping band, an inwardly directed portion carried by the clamping band, and a deflecting plate extending at an angle from said portion.

3. An article of the class described comprising an annular adjustable clamping band, and a deflecting plate carried by the band and arranged at an angle thereto.

In testimony whereof, I affix my signature, in the presence of two witnesses.

NELLIE FINLEY.

Witnesses:
 B. H. SHAW,
 F. VICORY.